United States Patent
Katoh et al.

(10) Patent No.: US 6,700,940 B1
(45) Date of Patent: Mar. 2, 2004

(54) CARRIER REPRODUCTION CIRCUIT

(75) Inventors: Hisakazu Katoh, Tokyo (JP); Akinori Hashimoto, Tokyo (JP); Tomohiro Saito, Tokyo (JP); Fumiaki Minematsu, Tokyo (JP); Kenichi Shiraishi, Yokohama (JP); Akihiro Horii, Zama (JP); Shoji Matsuda, Machida (JP); Soichi Shinjo, Machida (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/581,212

(22) PCT Filed: Dec. 25, 1998

(86) PCT No.: PCT/JP98/05949

§ 371 (c)(1),
(2), (4) Date: Aug. 15, 2000

(87) PCT Pub. No.: WO99/34569

PCT Pub. Date: Jul. 8, 1999

(30) Foreign Application Priority Data

Dec. 26, 1997 (JP) ............................................. 9-366906

(51) Int. Cl.⁷ ............................ H04B 17/00; H04B 3/46
(52) U.S. Cl. ...................... 375/326; 375/260; 375/329; 375/371; 375/375; 329/345; 329/346
(58) Field of Search ................................. 375/326, 333, 375/260, 329, 330, 371, 375

(56) References Cited

U.S. PATENT DOCUMENTS 5,440,587 A * 8/1995 Ishikawa et al. ............ 375/332
5,506,836 A * 4/1996 Ikeda et al. ................. 370/203
5,675,572 A * 10/1997 Hidejima et al. ........... 370/206
5,940,450 A * 8/1999 Koslov et al. ............... 375/344
6,285,654 B1 * 9/2001 Marchok et al. ............ 370/208

FOREIGN PATENT DOCUMENTS

| JP | 53-137657 | 12/1978 |
| JP | 2-192252 | 7/1990 |
| JP | 6-30073 | 2/1994 |
| JP | 9-186730 | 7/1997 |
| JP | 10-56486 | 2/1998 |
| JP | 10-341263 | 12/1998 |

OTHER PUBLICATIONS

International Search Report dated Mar. 23, 1999.

* cited by examiner

*Primary Examiner*—Don N. Vo
*Assistant Examiner*—Qutub Ghulamali
(74) *Attorney, Agent, or Firm*—Eric J. Robinson; Robinson Intellectual Property Law Office, P.C.

(57) ABSTRACT

A carrier reproduction circuit which can perform stable carrier reproduction even when reception takes place with low C/N values is provided. The reception phase of the demodulated known-pattern reception signal is detected with a frame synchronizing timing circuit (4), and based on the detected reception phase, either the phase difference table of absolute phase having one convergence point or the phase difference table of the phase rotated from the absolute phase by 180°, which are included in a carrier reproduction phase difference detecting circuit (8), is selected, and from the selected phase difference table the output based on the phase difference between the phase obtained from the signal point position of the reception signal and the phase convergence point is obtained, and thus carrier reproduction is implemented by undergoing the reproduced carrier frequency control via an AFC circuit (10) so that the phase obtained from the signal point position coincides with the phase convergence point.

2 Claims, 7 Drawing Sheets

| LEADING FRAME (1) $W_1, W_2$ | SECOND FRAME (2) $W_1, W_3$ | THIRD FRAME (3) $W_1, W_3$ | FOURTH FRAME (4) $W_1, W_3$ | FIFTH FRAME (5) $W_1, W_3$ | SIXTH FRAME (6) $W_1, W_3$ | SEVENTH FRAME (7) $W_1, W_3$ | EIGHTH FRAME (8) $W_1, W_3$ |
|---|---|---|---|---|---|---|---|

| DEMODULATION ROM TABLE | $A_1$ | $A_0$ |
|---|---|---|
| 8PSK | 0 | 0 |
| QPSK | 0 | 1 |
| BPSK (PRIMARY SIGNAL) | 1 | 0 |
| FRAME SYNCHRONIZING PATTERN, SUPERFRAME DISCRIMINATION PATTERN, AND BS | 1 | 1 |

CARRIER REPRODUCTION CIRCUIT

TECHNICAL FIELD

The present invention relates to a carrier reproduction circuit for a digital broadcasting receiver to receive BS digital broadcasting, and further in particular relates to a carrier reproduction circuit for a digital broadcasting receiver to receive digital modulated waves in which modulated waves as a result of a plurality of modulation systems respectively with different necessary C/N (the ratio of carrier power to noise power) values undergo time-base-multiplexing for transmission.

BACKGROUND ART

In the BS digital broadcasting system, there is employed a system in which burst symbol signals enabling reception with a low C/N value are inserted is adopted, added to a hierarchical transmission system in which the digital modulated waves, for example, 8PSK modulated waves, QPSK modulated waves, and BPSK modulated waves all being the primary signals, which are transmitted in a plurality of modulation systems with different necessary C/N values, are combined every specific interval, and in which transmission takes place repeatedly on a frame-by-frame basis. The burst symbol signals are signals having undergone BPSK modulation in the known PN codes.

Moreover, in such a hierarchical transmission system, the frame synchronization pattern as well as the superframe discrimination signals are also patterned in a predetermined fashion and have undergone BPSK modulation. The stable carrier reproduction is implemented by burst-receiving these BPSK-modulated signals during the reception operation at the time when the receiving C/N value is a low C/N value.

However, there used to be a problem with a carrier reproduction circuit in a conventional digital broadcasting receiver, and in such a case where a frequency converter such as an outdoor unit does not sufficiently perform, since the influence of its phase noise hampers stable carrier reproduction and hampers reception with a low C/N value.

The object of the present invention is to provide a carrier reproduction circuit which can implement stable carrier reproduction in reception with a low C/N value.

DISCLOSURE OF THE INVENTION

A carrier reproduction circuit according to the present invention in a digital broadcasting receiver which receives the digital modulated waves which are created by time-base-multiplexing the modulated waves with a plurality of modulation systems for transmission, comprises:

reception phase detection means to detect the demodulated known-pattern reception phases of the reception signals; and carrier reproduction phase difference detecting means comprising a phase difference table of an absolute phase having one phase convergence point and a phase difference table of the phase rotated from the absolute phase by 180° so that any one thereof is selected based on the phase detected by the reception phase detection means, to send out the output based on the phase difference between the phase obtained from the signal point position of the reception signal and the phase convergence point, wherein carrier reproduction is implemented by controlling the frequency of the reproduced carrier so that the phase obtained from the signal point position coincides with the phase convergence point.

In the carrier reproduction circuit according to the present invention, carrier reproduction is implemented by undergoing the reproduced carrier frequency control so that the reception phase of the demodulated known-pattern reception signal is detected, and based on the detected reception phase, either the phase difference table of absolute phase having one convergence point or the phase difference table of the phase rotated from the absolute phase by 180° is selected, and from the selected phase difference table the output based on the phase difference between the phase obtained from the signal point position of the reception signal and the phase convergence point is obtained, and the output based on the phase difference becomes 0, that is, the phase obtained from the signal point position coincides with the phase convergence point. In this case, the demodulated known-pattern reception signal is a BPSK signal, and since the phase difference is obtained with reference to the phase difference table having one phase convergence point, with the BPSK phase difference table the phase difference in excess of ±90° will not take place, and stable carrier reproduction will be able to be implemented even if the receiving C/N is a low C/N.

The carrier reproduction circuit according to the present invention further comprises carrier reproduction phase difference detecting means with a phase difference table having two phase convergence points in correspondence with the BPSK signals, wherein during the reception period of the demodulated BPSK signal being a primary signal, the phase difference table having two phase convergence points is selected, and carrier reproduction is implemented by undergoing the reproduced carrier frequency control so that the phase obtained from the signal point position of the BPSK signal being the primary signal comes to or coincides with the phase convergence point closer to the phase.

In the carrier reproduction circuit according to the present invention, during the reception period of the demodulated BPSK signal being a primary signal, the phase difference table having two phase convergence points is selected, and carrier reproduction will be able to be implemented by undergoing the reproduced carrier frequency control so that the phase obtained from the signal point position of the BPSK signal being the primary signal comes to or coincides with the phase convergence point closer to the phase.

PREFERRED EMBODIMENT OF THE INVENTION

The carrier reproduction circuit according to the present invention will be described by way of an embodiment as follows.

Figure 1:
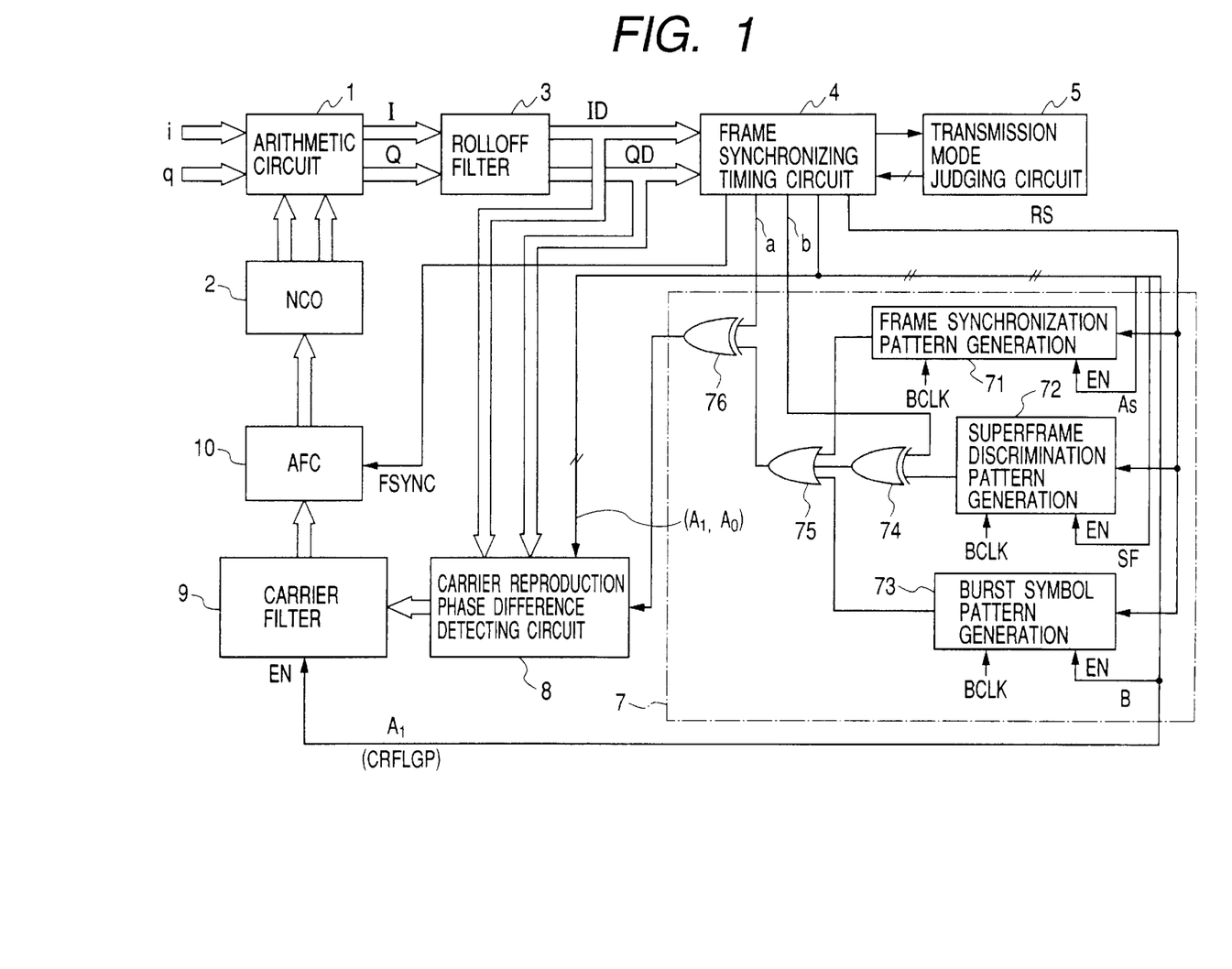
FIG. 1 is a block diagram showing the configuration of a carrier reproduction circuit according to an embodiment of the present invention.

FIG. 1 is a block diagram showing the configuration of a carrier reproduction circuit according to an embodiment of the present invention.

Figure 2A:
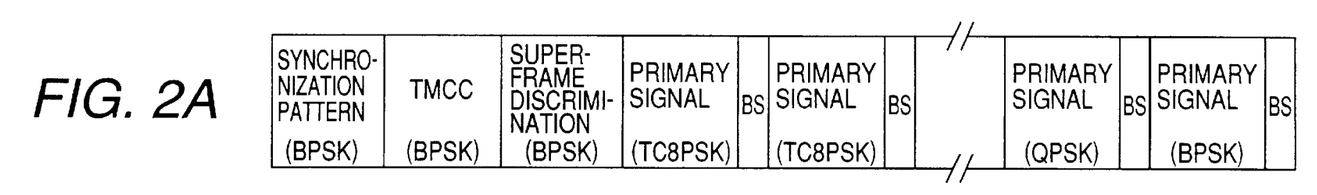
FIGS. 2A–2G show block diagrams of the frame of signals to be supplied to the carrier reproduction circuit according to an embodiment of the present invention and show waveforms of the signals Rs, A1, A0, As, Bs, and SF.

Prior to explanation of the carrier reproduction circuit according to an embodiment of the present invention, the frame configuration of a hierarchical transmission system will be described. FIG. 2A is a diagram showing an example of the frame configuration of a hierarchical transmission system. One frame is configured by one header portion 192 symbol, and 39936 symbol formed with a plurality of pairs consisting of 203 symbols and 4 symbols.

Further in detail, the frame is formed in the order of frame synchronization pattern (BPSK) 32 symbols (within which preceding 20 symbols are used), TMCC (Transmission and Multiplexing Configuration Control) pattern (BPSK) 128 symbols for transmission multiplexed configuration discrimination as well as superframe discrimination information pattern 32 symbols (within which preceding 20 symbols are used), primary signals (TC8PSK) 203 symbols, burst symbol signals (which are indicated as BS in FIG. 2A) 4 symbols undergoing BPSK modulation with pseudo random signals to be set every 1 frame period, primary signals (TC8PSK) 203 symbols, burst symbol signals 4 symbols, . . . , primary signals (QPSK) 203 symbols, burst symbol signals 4 symbols, primary signals (BPSK) 203 symbols, and burst symbol signals 4 symbols. Here, 8 frames are called a superframe, and the superframe discrimination information pattern is information for superframe discrimination. In addition, all or a portion of the burst symbols are known signals and deemed as BPSK signal. These known burst symbols are such burst symbols that are effective for reproducing synchronization, and will be simply called burst symbols hereunder.

Now description of the carrier reproduction circuit according to an embodiment of the present invention shown in FIG. 1 will be resumed. The carrier reproduction circuit according to an embodiment of the present invention comprises an arithmetic circuit 1, a numerical control oscillator 2, a rolloff filter 3 comprising a digital filter and showing raised cosine feature, a frame synchronizing timing circuit 4, a transmission mode discriminating circuit 5, a rotation signal generating circuit 7 for selecting a phase difference table, a carrier reproduction phase difference detecting circuit 8 having a carrier reproduction phase difference table, a carrier filter 9 comprising a low-pass digital filter, and an AFC circuit 10, and the reception phases of the reception signals are detected for the frame synchronizing pattern period, the superframe discrimination pattern period, and the burst symbol signal period being a reception signal of the known pattern demodulated in collaboration with the frame synchronizing timing circuit 4 and the transmission mode discriminating circuit 5, and in collaboration with the rotation signal generating circuit 7, the phase convergence point selects one phase difference table, the output, which is based on the phase difference between the phase obtained from the signal point position of the reception signal of the known pattern and the phase convergence point, is smoothed by the carrier filter 8, and is supplied to the AFC circuit 10, the frequency of the reproducing carrier will be controlled so that the phase obtained from the signal point position coincides with the phase convergence point.

Figure 3:
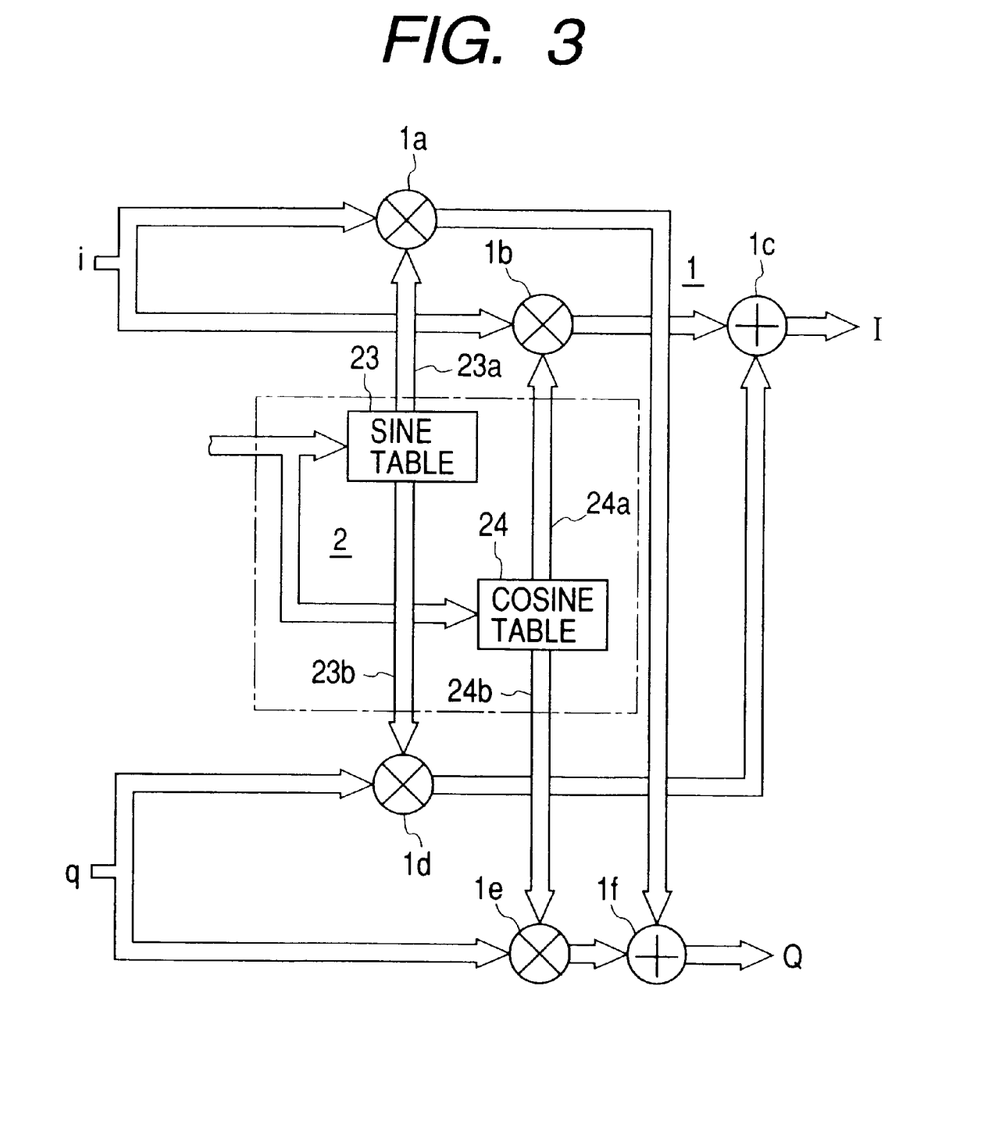
FIG. 3 is a block diagram showing the configuration of an arithmetic circuit as well as a numerical control oscillator in the carrier reproduction circuit according to an embodiment of the present invention.

The numerical control oscillator 2 comprises, as shown in FIG. 3, a sine wave table 23 outputting the sine wave data 23a and 23b having mutually opposite phases and a cosine wave table 24 outputting the cosine wave data 24a and 24b, and based on outputs from the AFC circuit 10 outputs sine wave data 23a and 23b as well as cosine wave data 24a and 24b each having mutually opposite polarity and in collaboration with the AFC circuit 10 outputs sine wave signals as well as cosine wave signals having mutually opposite polarity substantially forming the reproduced carrier.

The arithmetic circuit 1 comprises, as shown in FIG. 3, a multiplier 1a multiplying the baseband signals "i," which have been quasi-synchronously detected in the I axis, by the sine wave data 23a, a multiplier 1b multiplying the baseband signals "i" with the cosine data 24a, a multiplier 1d multiplying baseband signals "q," which have been quasi-synchronously detected in the Q axis, by the sine wave data 23b having an opposite polarity, a multiplier 1e multiplying the baseband signals "q" with the cosine wave data 24b, an adder 1c adding an output of the multiplier 1b to an output of the multiplier 1d and outputting the result as a baseband signal I, and an adder 1f adding an output of the multiplier 1a to an output of the multiplier 1e and outputting the result as a baseband signal Q, and in receipt of the output from the numerical control oscillator 2, causes the baseband signals "i" and "q," to undergo frequency synchronization, and sends out respectively to the rolloff filter 3 the baseband signals I and Q being frequency-tuned outputs.

The frame synchronizing timing circuit 4 receives the baseband signals ID and QD outputted from the rolloff filter 3, and sends out the TMCC pattern to the transmission mode judging circuit 5. Based on the decoded results of the TMCC patterns, the transmission mode judging circuit 5 sends out the two-bit transmission mode signals to the frame synchronizing timing circuit 4, corresponding to 8PSK signals (demodulated outputs having undergone demodulation on the 8PSK modulated waves are indicated as 8PSK signals) being high hierarchical signals, QPSK signals (demodulated outputs having undergone demodulation on the QPSK modulated waves are indicated as QPSK signals) being low hierarchical signals, and BPSK signals (demodulated outputs having undergone demodulation on the BPSK modulated waves are indicated as BPSK signals).

Figure 2B:
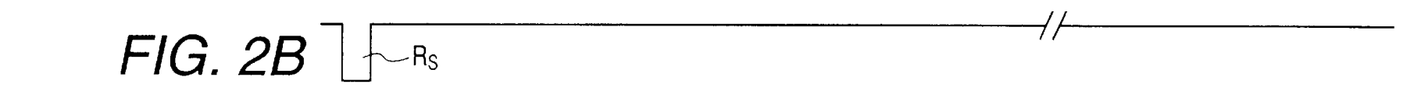
Figure 2C:
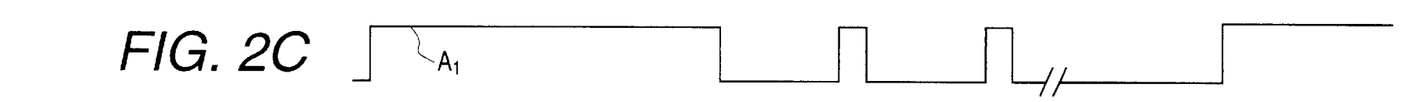
Figure 2D:
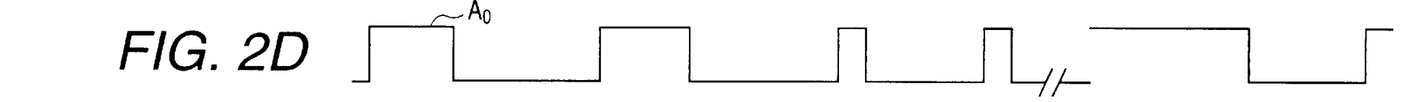
Figure 2E:
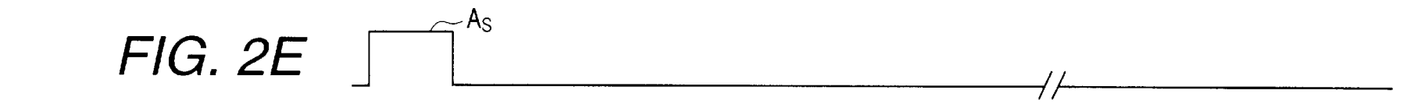
Figure 2F:
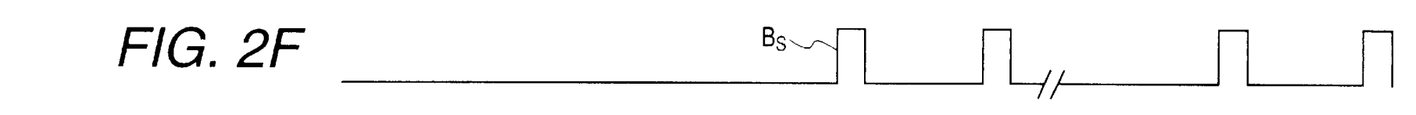
Figure 2G:
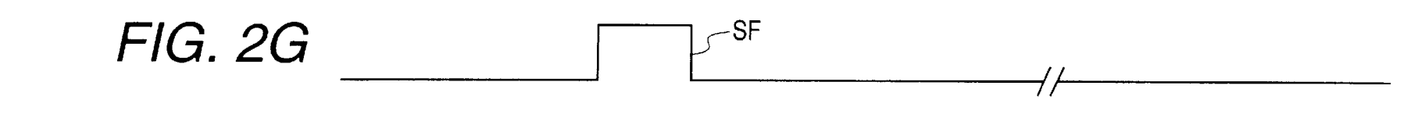

The frame synchronizing timing circuit 4 receives the baseband signals ID and QD and detects the frame synchronization pattern to output the frame synchronization signals FSYNCs to the AFC circuit 10, and in receipt of the transmission mode signals being outputted from the transmission mode judging circuit 5, outputs the signal Rs shown in FIG. 2B in synchronism with the frame synchronization pattern leader, and the signal A1 shown in FIG. 2C having a high potential during the header period as well as the BPSK signal period, the signal A0 shown in FIG. 2D having a high potential during the frame synchronization pattern period, the superframe discrimination pattern period, and the burst symbol signal period and the QPSK signal period, and the signal As shown in FIG. 2E having high potential during the frame synchronization pattern period, the signal Bs shown in FIG. 2F having high potential during the burst symbol signal period, and the signal SF shown in FIG. 2G having high potential during the superframe discrimination pattern period.

The frame synchronizing timing circuit 4 further detects whether the frame synchronizing pattern has been received in positive phase or received in opposite phase, and sends out the frame synchronizing pattern reception phase discriminating signal being a binary signal based on the result of the detection and the later-described superframe discrimination pattern discriminating signal being a signal to discriminate the superframe discrimination pattern. The frame synchronizing timing circuit 4 sends out the frame synchronizing pattern reception phase discriminating signal "a" of "0" when it has received the frame synchronizing pattern in positive phase, and sends out the frame synchronizing pattern reception phase discriminating signal of "1" when it has received the frame synchronizing pattern in opposite phase.

Various modulated signals inclusive of the above-described BPSK modulated respective period signals undergo so-called absolute-phasing so that the relationship between the phase angle and the symbols is predetermined at the transmitting party, serving to make it possible to implement absolute-phase reversion at the receiving party from the reference point of the reception point of the frame synchronizing pattern. In the burst reception operation during the BPSK modulated signal period, reception is implemented either in the absolute phase or in the phase that has undergone 180° phase-rotation. Judgment on which phase has been used for reception is made only by identifying the frame synchronizing pattern being "11101100110100101000" when reception takes place in absolute phase (hereafter to be referred to as positive phase), and the frame synchronizing pattern being "00010011001011010111" when reception takes place in opposite phase (hereafter to be referred to as opposite phase), and thereby whether the reception has taken place in positive phase or the reception has taken place in opposite phase can be determined by the frame synchronizing pattern detecting phase so that the frame synchronizing pattern reception phase discrimination signal can be obtained. In particular, for example, the signal is obtained by the AND gate to which respective bits of the frame synchronization pattern are inputted.

Figure 4A:
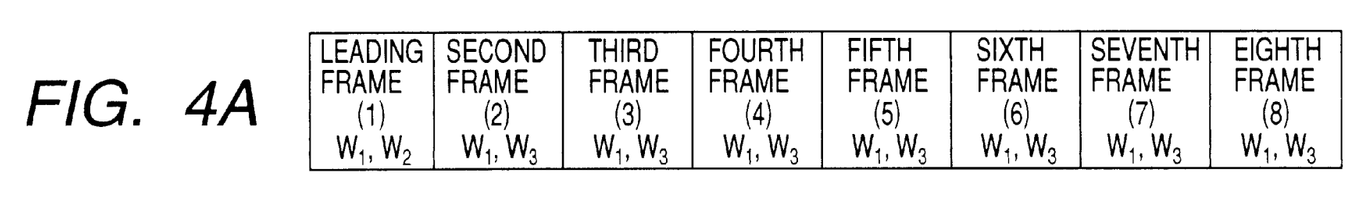
FIGS. 4A and 4B are explanatory diagrams showing a superframe discrimination pattern in signal frame to be supplied to the carrier reproduction circuit according to an embodiment of the present invention.

Next, the superframe discrimination pattern will be described. FIG. 4A is an explanatory diagram of the superframe discrimination pattern, and $W_1$ indicates a frame synchronization pattern, which is same for all frames. In FIG. 4A, the patterns $W_2$ and $W_3$ indicate the superframe discrimination pattern, and the frame synchronization pattern as well as the superframe discrimination pattern are extracted from each frame for description. For the leading frame, the superframe discrimination pattern is the $W_2$ pattern, and for the superframe discrimination patterns on all of seven frames from the second frame through the eighth frame are $W_3$, and the pattern $W_3$ is formed as an inverted pattern of $W_2$.

Figure 4B:
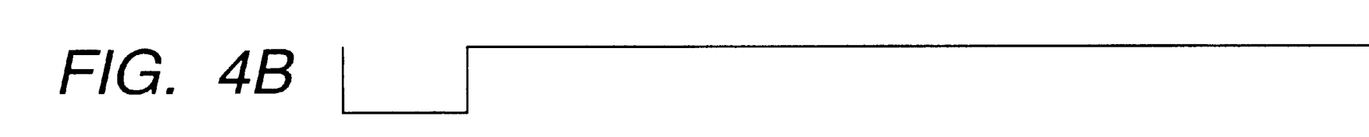

Here, regardless of whether the frame synchronizing pattern is received in positive phase or in opposite phase, as shown in FIG. 4B the superframe discrimination pattern discriminating signals "b" with a low potential during the leading frame of the superframe discrimination pattern $W_2$, and with a high potential during the succeeding seven frames of the superframe discrimination pattern $W_3$ are outputted from the frame synchronizing timing circuit 4.

The rotation signal generating circuit 7 comprises a frame synchronization pattern generating circuit 71, a superframe discrimination pattern generating circuit 72, the burst symbol pattern generating circuit 73, exclusive OR circuits 74 and 76, and an OR gate circuit 75, and outputs the rotation signals from the exclusive OR gate circuit 76.

The frame synchronization pattern generating circuit 71 is reset by the signal Rs, and receives the signal As, that is, the signal during the frame synchronization pattern period as an enabling signal, and sends out a signal configuring the frame synchronization pattern in synchronism with the bit clock signals to the exclusive OR circuit 76 sequentially via the OR gate circuit 75 and proceeds with exclusive OR operation with the frame synchronizing pattern reception phase discriminating signal "a" to be supplied to the exclusive OR circuit 76 for sending out as rotation signals. Accordingly, when the frame synchronization pattern is received in positive phase, the signal during the frame synchronization pattern period outputted from the frame synchronization pattern generating circuit 71 is sent out as a rotation signal, and when the pattern is received in opposite phase, a signal inverted from the frame synchronization pattern signal outputted from the frame synchronization pattern generating circuit 71 is sent out as the rotation signal.

The superframe discrimination pattern generating circuit 72 is reset by the signal Rs, and receives the signal SF, that is, the signal during the superframe discrimination pattern period as an enabling signal, and sequentially sends out to the exclusive OR circuit 74 the superframe discrimination pattern $W_2$ configuring the leading frame in synchronism with the bit clock signals and proceeds with exclusive OR operation with the superframe discrimination pattern discriminating signal "b" for sending out to the OR gate circuit 75.

Accordingly, by the superframe discrimination pattern discriminating signals "b," the superframe discrimination pattern of $W_2$ for the leading frame and the pattern $W_3$, which has undergone inversion on the pattern $W_2$ for the succeeding seven frames, are sent out from the exclusive OR circuit 74. Accordingly, from the exclusive OR circuit 74, the signals of the superframe discrimination pattern as shown in FIG. 4A will be sent out to the OR gate circuit 75.

The output from the exclusive OR circuit 74, which is supplied to the exclusive OR circuit 76 via the OR gate circuit 75, undergoes the exclusive OR operation with the frame synchronizing pattern reception phase discriminating signal "a" which is supplied to the exclusive OR circuit 76, and is sent out as a rotation signal. Accordingly, when the frame synchronization pattern is received in positive phase, the superframe discrimination patterns $W_2$, $W_3$, $W_3$, $W_3$, $W_3$, $W_3$, $W_3$, and $W_3$, which are outputted from the exclusive OR circuit 74, are sent out as rotation signals for respective frames from the leading frame through the eighth frame, and when the frame synchronization pattern is received in opposite phase, the inverted pattern of the superframe discrimination pattern outputted from the exclusive OR circuit 74, that is, the patterns $W_3$, $W_2$, $W_2$, $W_2$, $W_2$, $W_2$, $W_2$, and $W_2$ are sent out as rotation signals for respective frames from the leading frame through the eighth frame.

The burst symbol pattern generating circuit 73 is reset by the signal Rs, and receives the signal Bs, that is, the signal during the burst symbol pattern period as an enabling signal, and sends out in succession in synchronism with the bit clock signals to the exclusive OR circuit 76 via the OR gate 75 the burst symbol signals, which undergo the exclusive OR operation with the frame synchronizing pattern reception phase discriminating signal "a" which is supplied to the exclusive OR circuit 76, and sends them out as a rotation signal. Accordingly, when the frame synchronization pattern is received in positive phase, the burst symbol signal outputted from the burst symbol pattern generating circuit 73 is sent out as a rotation signal, and when the pattern is received in opposite phase, a signal inverted from the burst symbol signal outputted from the burst symbol pattern generating circuit 73 is sent out as the rotation signal.

Accordingly, when the frame synchronization pattern is received in positive phase, the frame synchronization pattern signal is outputted from the rotation signal generating circuit 7 as a rotation signal during the frame synchronization pattern period, and the signal shown in FIG. 4A corresponding to the respective frame numbers is sent out on a frame-by-frame basis as a rotation signal during the superframe discrimination pattern period, and the burst symbol signal is sent out as a rotation signal during the burst symbol pattern period.

When the frame synchronization pattern is received in opposite phase, the inverted signal of the frame synchronization pattern is outputted from the rotation signal generating circuit 7 as a rotation signal during the frame synchronization pattern period, and the inverted signal shown in FIG. 4A corresponding to the respective frame numbers is sent out on a frame-by-frame basis as a rotation signal during the superframe discrimination pattern period, and the inverted signal of the burst symbol signal is sent out as a rotation signal during the burst symbol pattern period.

In receipt of the baseband signals ID and QD, signals A1 and A0 and the rotation signal, the carrier reproduction phase difference detecting circuit 8 detects the phase difference for the signal point based on the baseband signals ID and QD, and sends out the phase difference voltage values based on the phase difference.

Figure 5:
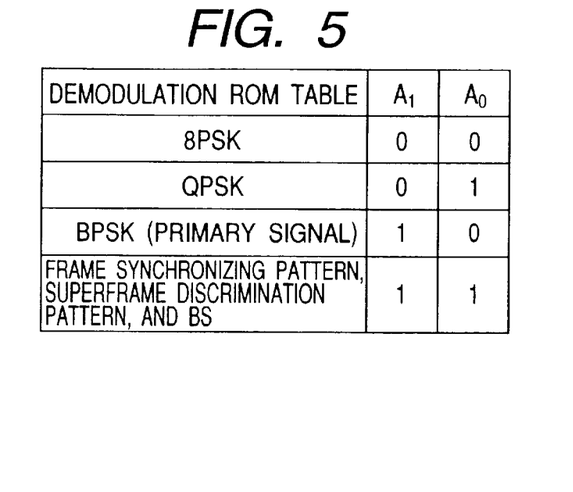
FIG. 5 is an explanatory graph on a demodulation ROM table in a carrier reproduction circuit according to an embodiment of the present invention.
Figure 6A:
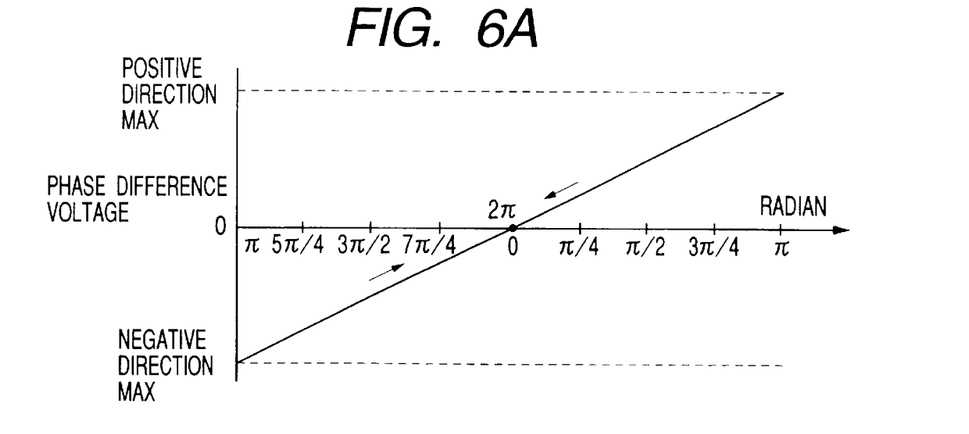
FIGS. 6A and 6B are explanatory graphs on a phase difference table (a phase difference table on the absolute phase) in the carrier reproduction circuit according to an embodiment of the present invention.
Figure 6B:
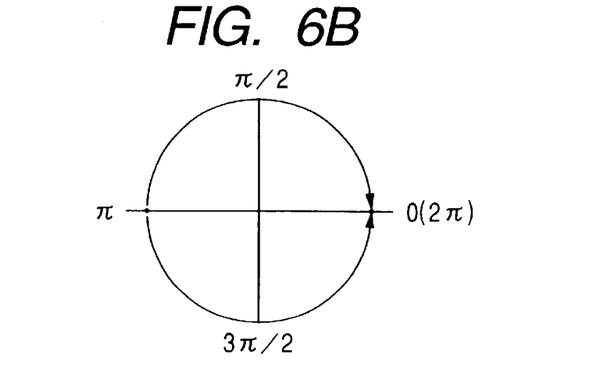
Figure 7A:
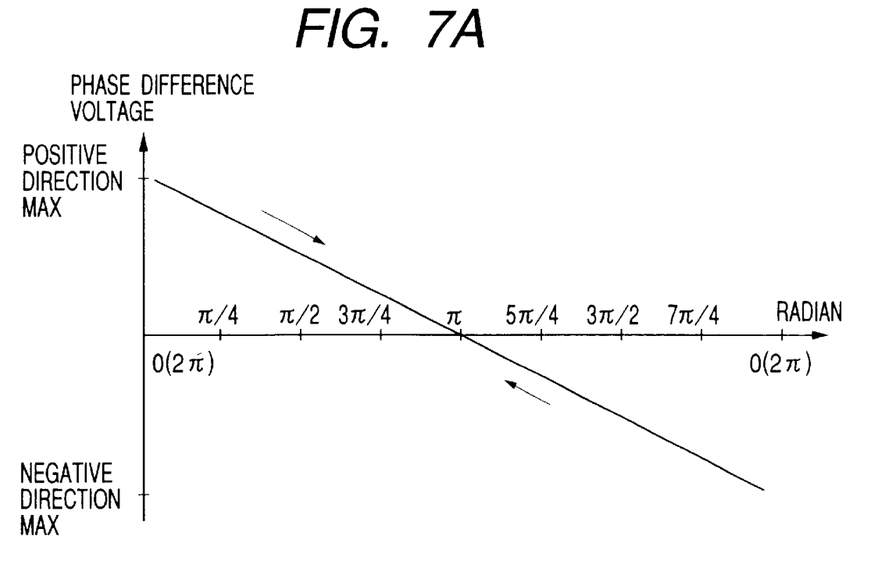
FIGS. 7A and 7B are explanatory graphs on a phase difference table (a phase difference table on the phase having undergone 180° rotation) in the carrier reproduction circuit according to an embodiment of the present invention.
Figure 7B:
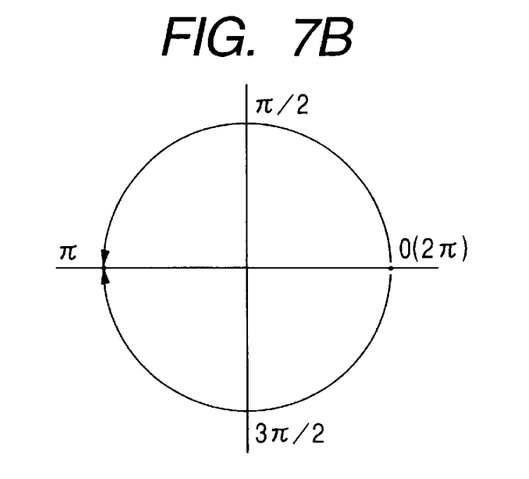
Figure 8A:
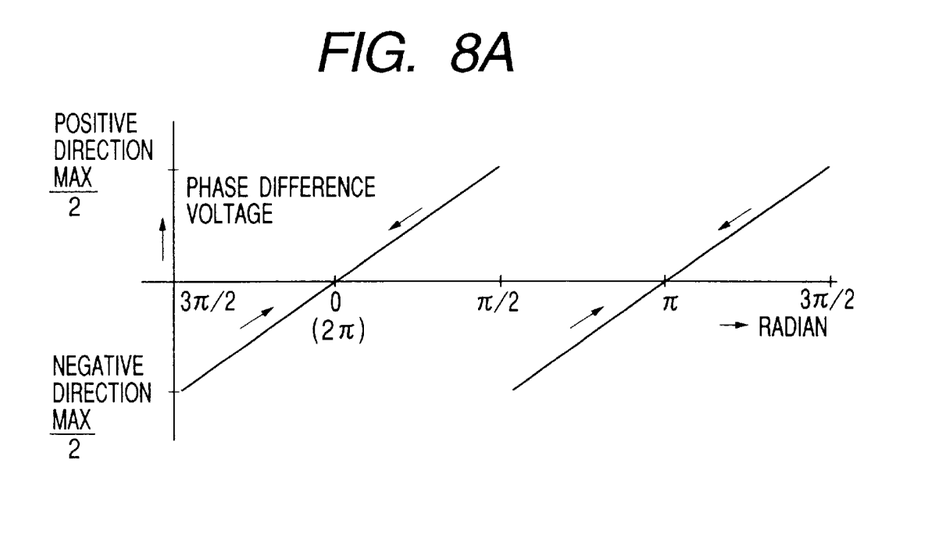
FIGS. 8A and 8B are explanatory graphs on a phase difference table (in the case of a BPSK signal) in the carrier reproduction circuit according to an embodiment of the present invention.
Figure 8B:
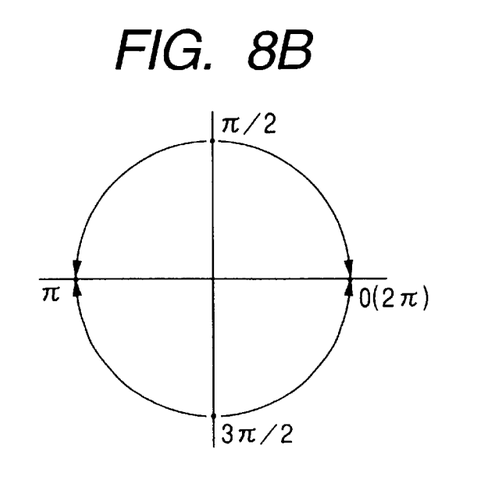

Further in detail, the carrier reproduction phase difference detecting circuit 8 comprises a demodulation ROM table shown in FIG. 5, the phase difference table (also described in the present specification as phase difference table on the absolute phase) shown in FIGS. 6A and 6B having one phase convergence point (0(2π) radian) which gets locked only with high potential carriers, the phase difference table (also described in the present specification as phase difference table on the phases having undergone 180° rotation) shown in FIGS. 7A and 7B having one phase convergence point (π radian) which gets locked only with low potential carriers, and the phase difference table having two phase convergence points (that is, two of 0 (2π) radian and π radian) which correspond with the BPSK signal shown in FIGS. 8A and 8B, discriminates the transmission mode in accordance with the signals A1 and A0 based on the table shown in FIG. 5, selects the phase difference table based on the discriminated transmission mode 0, obtains the phase from the signal point position of the baseband signals ID and QD, and obtains the phase difference voltage for that phase to send out to the carrier filter 9.

In the carrier reproduction phase difference detecting circuit 8, when it discriminates that the transmission mode, for example, is in the period of the frame synchronization pattern, the superframe discrimination pattern, and the burst symbol signals (the signal A1, A0 is "1, 1"), the reference position of phase attained from the signal point position is 0 (2π) radian, or π radian, and when each signal of the frame synchronization pattern, the superframe discrimination pattern, and the burst symbol signals is with a high potential, the phase difference table shown in FIGS. 6A and 6B is selected by the rotation signal, and when each signal of the frame synchronization pattern, the superframe discrimination pattern, and the burst symbol signals is with a low potential, the phase difference table shown in FIG. 7A and 7B is selected by the rotation signal.

The phase difference table shown in FIGS. 6A and 6B is selected, the reference position of the signal point is 0 (2π) radian, and when phases obtained from the signal point position are in an increasing direction from not less than π radian to 0 (2π) radian, a negative phase difference voltage value shown in FIG. 6A is outputted for the phase and when phases are those which are in a decreasing direction from less than π radian to 0 (2π) radian, a positive phase difference voltage value shown in FIG. 6A is outputted for the phase, and under control of the AFC circuit 10 to which this phase difference voltage is supplied, the phases having been attained from the signal point positions undergo as shown in FIGS. 6A and 6B convergence to 0 (2π) radian. In this case, the phase difference voltage value takes the maximum value in the positive direction or the maximum value in the negative direction when the phase is π radian.

When the phase difference table shown in FIGS. 7A and 7B is selected, the reference phase obtained from the signal point position is π radian, and when phases obtained from the signal point position are in an increasing direction from not less than 0 (2π) radian to π radian, a negative phase difference voltage value shown in FIG. 7A is outputted for the phase and when phases are those which are in a decreasing direction from less than 0 (2π) radian to π radian, a positive phase difference voltage value shown in FIG. 7A is outputted for the phase, and under control of the AFC circuit 10 to which this phase difference voltage is supplied, the phases having been attained from the signal point positions undergo as shown in FIGS. 7A and 7B convergence to π radian. In this case, the phase difference voltage value takes the maximum value in the positive direction or the maximum value in the negative direction when the phase is 0 (2π) radian.

In the carrier reproduction phase difference detecting circuit 8, when it discriminates that the transmission mode, for example, is (primary signal) BPSK signals (the signal A1, A0 is "1, 0"), the reference position of phase attained from the signal point position of the (primary signal) BPSK signals is 0 (2π) radian, and π radian, and the phase difference table shown in FIGS. 8A and 8B comprising two phase convergence point 0 (2π) radian and π radian is selected.

In this case, when the phases obtained from the signal point position are in an increasing direction from not less than 3π/2 radian to 0 (2π) radian, a negative phase difference voltage value shown in FIG. 8A is outputted for the phase and when phases are those which are in a decreasing direction from less than π/2 radian to 0 (2π) radian, a positive phase difference voltage value shown in FIG. 8A is outputted for the phase, and when the phases are in an increasing direction from not less than π/2 radian to π radian, a negative phase difference voltage value shown in FIG. 8A is outputted for the phase and when phases are those which are in a decreasing direction from less than 3π/2 radian to π radian, a positive phase difference voltage value shown in FIGS. 8A and 8B is outputted for the phase, and the phases undergo as shown in FIGS. 8A and 8B convergence to 0 (2π) radian or π radian. In this case, the phase difference voltage value takes the maximum value in the positive direction or the maximum value in the negative direction when the phase is $3\pi/4$ radian or $\pi/4$ radian, and this maximum value is half the maximum value in the case of FIG. 6 and FIG. 7 in the case where the convergence point is one.

In the carrier reproduction phase difference detecting circuit 8, when it discriminates that the transmission mode, for example, is the QPSK signals (the signal A1, A0 is "0, 1"), or when it discriminates that the transmission mode is the 8PSK signals (the signal A1, A0 is "0, 0"), the phase difference table shown in FIGS. 8A and 8B is selected. The phase difference table for this case is the same as in the case of (the primary signal) BPSK signal, but as being described later, for this case, there arise no problems since the carrier filter 9 is not enabled.

The phase difference voltage outputted from the carrier reproduction phase difference detecting circuit 8 based on the phases obtained from the signal point positions of the baseband signals ID and QD is supplied to the carrier filter 9 comprising a digital low-pass filter, and the phase difference voltage is smoothed. In this case, the signals A1 are supplied as carrier filter controlling signals (CRFLGP), filter operation is performed on a selective basis only during the period of the signals A1 maintaining a high potential, that is, the interval of the header, and (the primary signals) BPSK signal interval, and during the period of the signals A1 maintaining a low potential, the filter output at the filter operation immediately prior thereto is maintained. The output from the carrier filter 9 is supplied to the AFC circuit 10 as a tuning voltage.

Operation of the carrier reproduction circuit according to an embodiment of the present invention described above will be described.

In a BS digital broadcasting receiver, desired signals within a generally designated channel undergo scanning with scanning operation of the AFC circuit 10, and undergo operation so that the carrier is captured with the carrier reproduction circuit. In the carrier reproduction circuit according to an embodiment of the present invention, in receipt of the desired signals, which undergo orthogonal demodulation with the quasi-synchronous detecting system, the demodulated baseband signals i and q, which are supplied to the arithmetic circuit 1, as well as output data from the numerical controlling oscillator 2 undergo arithmetic operation, and are converted into the baseband signals I and Q.

The baseband signals I and Q are supplied to the rolloff filter 3, and the baseband signals ID and QD via the rolloff filter 3 are supplied to the carrier reproduction phase difference detecting circuit 8, and the phase difference voltage for carrier reproduction based on the phases obtained from the signal point positions based on the baseband signals ID and QD is obtained, and then the phase difference voltage is smoothed by the carrier filter 9 and is supplied to the AFC circuit 10 as the tuning voltage, and the output of the AFC circuit 10 is given to the numerical controlling oscillator 2, and the carrier frequency is controlled so that the phase difference voltage becomes 0, and thus carrier reproduction is implemented.

On the other hand, the baseband signals ID and QD are supplied to the frame synchronizing timing circuit 4, and the frame synchronizing pattern is detected, and thus the frame synchronization is captured to establish the frame timing, then time-sequential positions respectively of the frame synchronizing pattern, the TMCC pattern, the superframe discrimination pattern, and the burst symbol signal are clarified, and the TMCC pattern is sent out to the transmission mode judging circuit 5 to undergo decoding, and in receipt of the transmission mode signal outputted from the transmission mode judging circuit 5, the frame synchronizing timing circuit 4 sends out the signals Rs, A1 and A0, As, Bs and SF.

Under this condition, the signals A1 maintaining a high potential during the frame synchronizing pattern period, the TMCC pattern period, the superframe discrimination pattern period, and the burst symbol signal period, and the BPSK signal (the primary signals) period, are supplied as carrier filter controlling signals (CRFLGP), and filter operation is performed during the period of the carrier filter controlling signals (CRFLGP) maintaining a high potential, that is, the period when the carrier filter 9 performs filtering operation, which is halted during the period of a low potential, the output state immediately prior to the halt is maintained, and the carrier reproduction is implemented by the burst reception.

From the frame synchronizing timing circuit 4, the frame synchronizing pattern receiving phase recognizing signals based on whether the frame synchronizing pattern has been received in positive phase or has been received in opposite phase and the superframe recognizing pattern discrimination signals recognizing the superframe discrimination pattern are sent out to the rotation signal generating circuit 7, and from the receiving phase and time-sequential position of the frame synchronizing pattern, and the superframe discrimination pattern, the patterns of which will become known at the receiving party, and the burst symbol signals, and reception phase points for respective times are detected in the rotation signal generating circuit 7, and based on these detected receiving phase points, the rotation signals are sent out to the carrier reproduction phase difference detecting circuit 8.

In the carrier reproduction circuit phase difference detecting circuit 8 to which the rotation signals have been supplied, during the frame synchronizing pattern period, the superframe discrimination pattern period, and the burst symbol signal period, based on the rotation signals, one of the phase difference tables with one convergence point shown in FIG. 6 or FIGS. 7A and 7B selected, and then the phase difference voltage for the phases obtained from the signal point positions of the respective baseband signals ID and QD during the frame synchronizing pattern period, the superframe discrimination pattern period, and the burst symbol signal period is obtained, and the phase difference voltage, which is smoothed with the carrier filter, is sent out to the AFC circuit 10, and the carrier frequency is controlled and carrier reproduction is implemented.

As described above, during the frame synchronizing pattern period, the superframe discrimination pattern period, and the burst symbol signal period having the known patterns, one of the phase difference tables comprising either the absolute phase or the 180° rotated phase is selected, and thus, during these respective periods, convergence will take place to either 0 ($2\pi$) radian or $\pi$ radian respectively with the phase difference table having only one convergence point so as to generate a tuning voltage without any phase difference error at carrier reproduction, and thus stable carrier reproduction can be implemented.

During the TMCC pattern period as well as the BPSK signal (the primary signal) period, the phase difference table comprising two convergence points shown in FIGS. 8A and 8B is selected, and the phase difference for the phases obtained from the signal point positions during the TMCC pattern period as well as the BPSK signal (the primary signal) period is obtained from the phase difference table in FIG. 8A as well as FIG. 8B, and thus carrier reproduction is implemented. The reason thereof is that the patterns are not known yet during the TMCC pattern period as well as the BPSK signal (the primary signal) period, and thus the phase difference tables in FIGS. 6A and 6B or FIGS. 7A and 7B cannot be used.

In addition, by inverting the baseband signals ID and IQ simultaneously by the rotation signals, instead of the phase difference table for the absolute phase and the phase difference table for the 180° rotated phase as shown in FIGS. 6A and 6B and FIGS. 7A and 7B, the phase difference may be arranged to be obtained with one of the phase difference tables for the absolute phase shown in FIGS. 6A and 6B.

As described above, in the carrier reproduction circuit according to an embodiment of the present invention, for the frame synchronizing pattern period having a known pattern, the superframe discrimination pattern period, and the burst symbol signal period, the cases with use of the phase difference table comprising the absolute phase as well as the phase difference table comprising the 180° rotated phase was exemplified, one or more frame synchronizing pattern periods having known patterns, the superframe discrimination pattern period, and the burst symbol signal period may be used. In this case, the rotation signal generating circuit 7 is simplified.

INDUSTRIAL APPLICABILITY

As described so far, according to the carrier reproduction circuit of the present invention, at carrier reproduction phase difference detection for the period of reception of the known-pattern signal, either the phase difference table comprising the absolute phase or the phase difference table comprising the 180° rotated phase with one convergence point is selected based on the reception phase of the reception signal, and the carrier reproduction is implemented, and thus, giving rise to an advantage that without the phase difference error to take place stable carrier reproduction can be implemented even if the receiving C/N is low C/N.

What is claimed is:

1. A carrier reproduction circuit for use in a digital broadcasting receiver which receives a digital modulated communication signal comprising a plurality of modulated primary signals and a plurality of modulated burst symbol signals wherein the modulated primary signals are obtained by modulating a digital primary signal with a plurality of modulation methods with respective necessary C/N values being different, and each of the modulated burst symbol signals is obtained by modulating a burst symbol signal having a known-pattern with the modulation method associated with the least necessary C/N value, said carrier reproduction circuit, comprising:

reception phase detection means for detecting a reception phase of the demodulated burst symbol signal; and carrier reproduction phase difference detecting means, comprising a phase difference table of absolute phase having one phase convergence point and a phase difference table of the phase rotated from the absolute phase by 180° so that any one thereof is selected based on the phase detected by said reception phase detection means, to send out the output based on the phase difference between the phase obtained from the signal point position of said reception signal and the phase convergence point, wherein carrier reproduction is implemented by controlling the frequency of the reproduced carrier so that the phase obtained from said signal point position coincides with the phase convergence point.

2. The carrier reproduction circuit according to claim 1, comprising carrier reproduction phase difference detecting means with a phase difference table having two phase convergence points in correspondence with the BPSK signals, wherein during the reception period of the demodulated BPSK signal being a primary signal, the phase difference table having two phase convergence points is selected, and carrier reproduction is implemented by undergoing the reproduced carrier frequency control so that the phase obtained from the signal point position of the BPSK signal being said primary signal coincides with the phase convergence point closer to said phase.

* * * * *